United States Patent [19]
Hirt

[11] Patent Number: 5,926,301
[45] Date of Patent: Jul. 20, 1999

[54] METHOD AND APPARATUS FOR OPTICAL WIRELESS COMMUNICATION

[75] Inventor: Walter Hirt, Wettswil, Switzerland

[73] Assignee: International Business Machines Corporation, Armonk, N.Y.

[21] Appl. No.: 08/669,327

[22] PCT Filed: Feb. 28, 1994

[86] PCT No.: PCT/EP94/00577

§ 371 Date: Aug. 30, 1996

§ 102(e) Date: Aug. 30, 1996

[87] PCT Pub. No.: WO95/23461

PCT Pub. Date: Aug. 31, 1995

Related U.S. Application Data

[51] Int. Cl.[6] .......................... H04B 10/00; H04B 10/04
[52] U.S. Cl. .......................... 359/154; 359/172; 359/184; 359/186; 359/189; 375/239; 340/825.72
[58] Field of Search ..................... 359/154, 172, 359/182, 184, 186, 189; 375/239, 303, 334, 340; 455/151.2; 340/825.72; 370/277

[56] References Cited

U.S. PATENT DOCUMENTS

| | | | |
|---|---|---|---|
| 4,151,407 | 4/1979 | McBride et al. | 359/186 |
| 4,584,720 | 4/1986 | Garrett | 359/186 |
| 4,648,133 | 3/1987 | Vilnrotter | 359/186 |
| 5,113,278 | 5/1992 | Degura et al. | 359/154 |

FOREIGN PATENT DOCUMENTS

| | | |
|---|---|---|
| 0477699 | 9/1991 | European Pat. Off. |
| 2219164 | 11/1989 | United Kingdom ............ 359/186 |

OTHER PUBLICATIONS

Patent Abstracts of Japan, vol. 15, No. 46 (E–1029) 1991 & JP,A,02 279 035 (Mitsui Mining & Smelting).
Patent Abstracts of Japan, vol. 2, No. 104 (E–053) 1978 & JP,A,53 070 709 (Fujitsu).
Patent Abstracts of Japan, vol. 15, No. 29 (E–1026) 1991 & JP,A,02 272 928 (Mitsui Mining & Smelting).

*Primary Examiner*—Kinfe-Michael Negash
*Attorney, Agent, or Firm*—John D. Flynn

[57] ABSTRACT

The wireless communication system, comprising a transmitter and a receiver, operates according to the present PPM-FSK modulation format with two subcarrier frequencies $f_1$ and $f_2$. The PPM encoded data on the main data channel 43 are fed to two pulse shaping circuits (30, 31) for additional frequency modulation with said frequencies. The resulting hybrid PPM-FSK signal is used to drive a light source (32). The receiver comprises a photodiode (34) coupled to an amplifier (35). The electrical signal obtained at the output of the amplifier (35) is fed to bandpass filters (36, 37) and envelope detectors (38, 39). The outputs of the envelope detectors are fed to a device (40) designed for pulse restoration and frequency decision. In a first operation, device (40) uses the output signals of the two envelope detectors (38, 39) to derive from them the estimated PPM encoded data signal. It then uses this signal to produce estimated restored pulses and outputs them. Then device (40) uses the output signals of the two envelope detectors to derive the estimated frequency information which carries auxiliary data information. It then uses this signal to produce estimated restored auxiliary data bits.

16 Claims, 9 Drawing Sheets

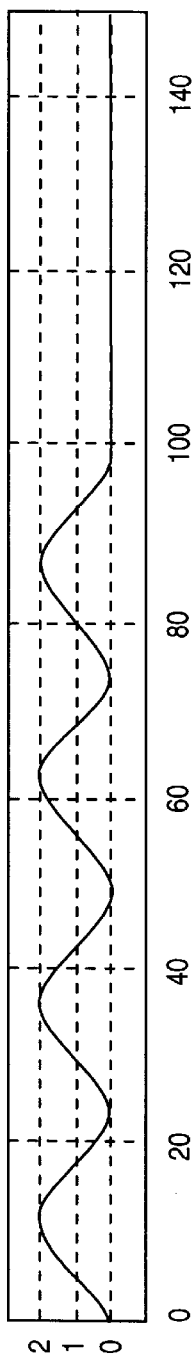
FIG. 5A
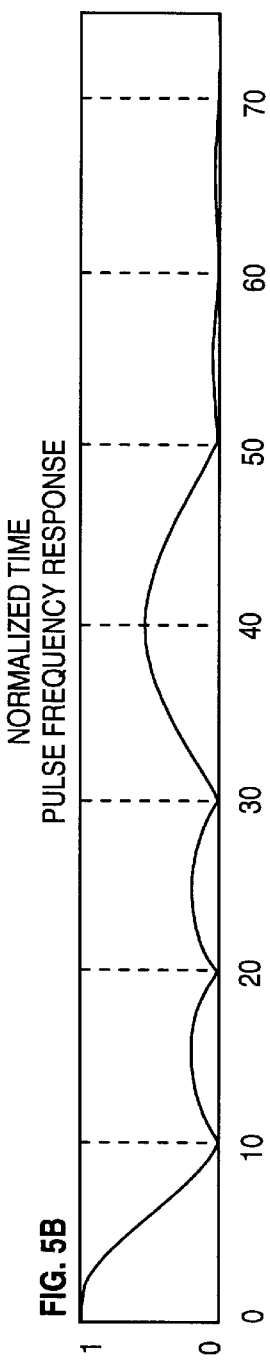
FIG. 5B
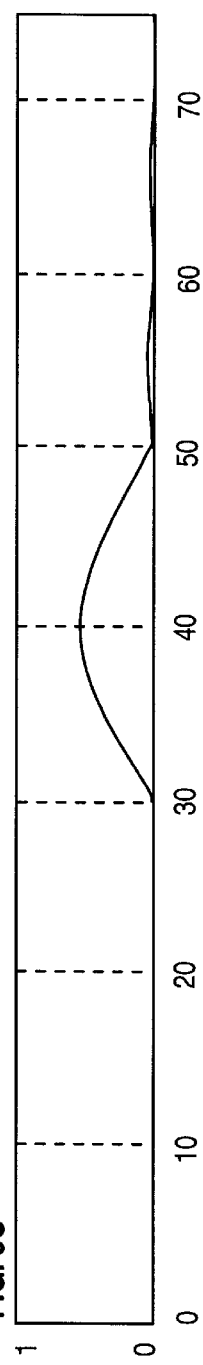
FIG. 5C
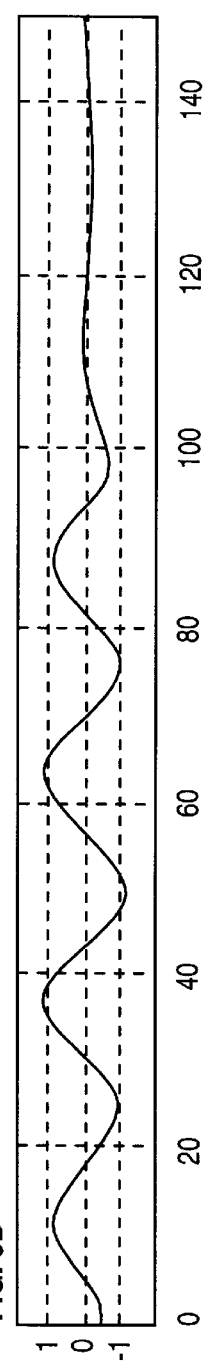
FIG. 5D
FIG. 5

FIG. 6A PULSE TIME RESPONSE
FIG. 6B PULSE FREQUENCY RESPONSE
FIG. 6C FILTERED PULSE FREQUENCY RESPONSE
FIG. 6D FILTERED PULSE TIME RESPONSE

NORMALIZED AMPLITUDE OR MAGNITUDE

METHOD AND APPARATUS FOR OPTICAL WIRELESS COMMUNICATION

TECHNICAL FIELD

The present invention concerns a method and apparatus for optical communication based on pulse-position-modulation (PPM).

BACKGROUND OF THE INVENTION

With the rapidly increasing number of workstations and personal computers (e.g. desktop or handheld ones) in all areas of business, administration, fabrication etc., there is also an increasing demand for flexible and simple interconnection of these systems. There is a similar need as far as the hook-up and interconnection of peripheral devices, such as keyboards, computer mice, printers, plotters, scanners, displays etc., is concerned. The use of electrical wire networks and cables becomes a problem in particular with increasing density of systems and peripheral devices and in the many cases where the location of systems, or the configuration of subsystems, must be changed frequently. It is therefore desirable to use wireless communication systems for interconnecting such devices and systems to eliminate the requirement of electrical cable networks.

In particular the use of infrared signals for exchanging information between systems and remote devices received increased interest during recent years. The advantage of such wireless infrared communications systems is the elimination of most of the conventional wiring. With respect to radio frequency (RF) wireless transmission, optical infrared (IR) wireless transmission has the advantages that no communication regulations apply and no PTT or FCC license is required. Additionally, no disturbance by electro-magnetic interference and no interference from other RF channels can occur, and the radiation is confined to a room so that better data security is guaranteed than with RF systems. There is thus no interference with similar systems operating next door and a higher degree of data security is afforded than radio-frequency transmission can offer. In contrast to radio-frequency antennae, the dimensions of light emitting diodes (LED) and photodiodes are usually smaller, which is of particular interest when designing portable computers.

Given an optical channel where the optical transmitter power, the ambient light conditions, and the photodiode area are all fixed quantities, power efficiency becomes the main criterion in choosing a modulation scheme in order to maximize the distance over which reliable transmission can be maintained. Judged by the power efficiency and ignoring bandwidth efficiency, L-slot pulse-position-modulation (L-PPM) would be the preferred modulation scheme for optical communication. Being a baseband modulation scheme, L-PPM is not suited for those applications where multiple collocated optical networks are required, since only a single L-PPM system can operate in a given location without coordination between collocated networks. As already mentioned, there is an increasing demand for optical wireless local area networks (WLANs) and peer-to-peer networks which can coexist independently within the same location. PPM is not suited for these kind of collocated networks.

There is no approach known which satisfies the requirements for high power efficiency and reliability under adverse conditions as well as the demand for collocated independent disturbance- and interference-free optical networks. While L-PPM might be the preferred method with respect to power efficiency, it cannot provide for collocated multiple channels.
duplex transmission, and
flexible use and adaptation of bandwidth and data throughput.

In addition, optical PPM communications systems suffer from interference caused by fluorescent light sources at frequencies up to 500 kHz.

Frequency Shift Keying (FSK), on the other hand, is a carrier (bandpass) modulation scheme which is well suited for multiple channel operation but is poor in terms of power efficiency when compared to L-PPM. IR communications systems with bandwidths of up to 30 MHz can be achieved with todays component technology and further advances in terms of available bandwidth are expected in the future. Present baseband PPM systems do not fully exploit this available frequency spectrum.

It is another disadvantage of known optical communication systems that they are susceptible to interference caused by residual ambient light. Especially wireless IR data communication systems operating in a daylight environment are exposed to a high level of shot noise caused by light falling onto the receiver photodiode. Light from an incandescent desk lamp falling on the receiver diode is a source of shot noise having a detrimental influence on the IR communication, too. Due to residual ambient light, or due to the degree of optical path obstructions, the maximum transmission range between any two stations of an optical wireless communication system is variable. As a result, the network connectivity is unreliable except for very short distances.

Furthermore, the output power of a light source used as transmitter, e.g. a conventional LED or a laser diode, is limited such that the maximum transmission range is limited, too. These diodes can usually not be operated constantly, since the operation at high power has a detrimental influence on their lifetime. When increasing the photodiode area of the receiver, the transmission range may be further increased. Such a receiver is usually integrated in a portable computer or a peripheral device and the size of the photodiode area is limited due to design considerations and cost restrictions.

SUMMARY OF THE INVENTION

It is an object of the present invention to provide a method and apparatus for improved and more flexible optical communication.

It is another object of the present invention to provide a method and apparatus for improved infrared (IR) communication making efficient use of the characteristics of IR light emitting diodes and IR emitting lasers.

It is an object of the present invention to provide a method and apparatus for optical, multiple collocated networks and duplex transmission networks.

The above objects have been accomplished by provision of a new modulation scheme for optical wireless communication. This new modulation scheme is based on an L-slot pulse-position-modulation (L-PPM) scheme and allows the transmission of additional or redundant information as bandpass components as claimed.

DESCRIPTION OF THE DRAWINGS AND NOTATIONS USED

The invention is described in detail below with reference to the following drawings:

FIG. 5 illustrates an estimated example of a rectangular shaped pulse for a L-slot hybrid PPM-FSK system (see also FIG. 3A):
 a) pulse time response,
 b) pulse frequency response,
 c) frequency response of filtered (bandpass) pulse, and
 d) time response of filtered (bandpass) pulse.

DETAILED DESCRIPTION

An optical wireless communications system, as herein addressed, comprises a first unit serving as transmitter and a second unit as receiver; the transmitter comprising a light source and the receiver comprising a photodiode. The word unit is hereinafter used as a synonym for all kinds of computers, terminals, repeaters, peripheral devices, etc. which might communicate with each other, either unidirectional or bidirectional.

Note that, when herein referring to optical signal source, all different kinds of diodes, including the conventional LEDs as well as laser diodes, are meant.

Figure 1A:
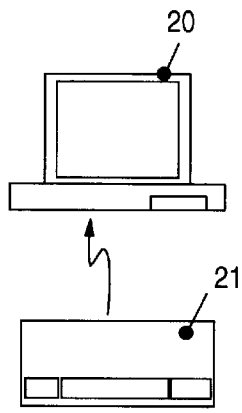
FIG. 1A shows a wireless optical link between a computer and a keyboard.
Figure 1B:
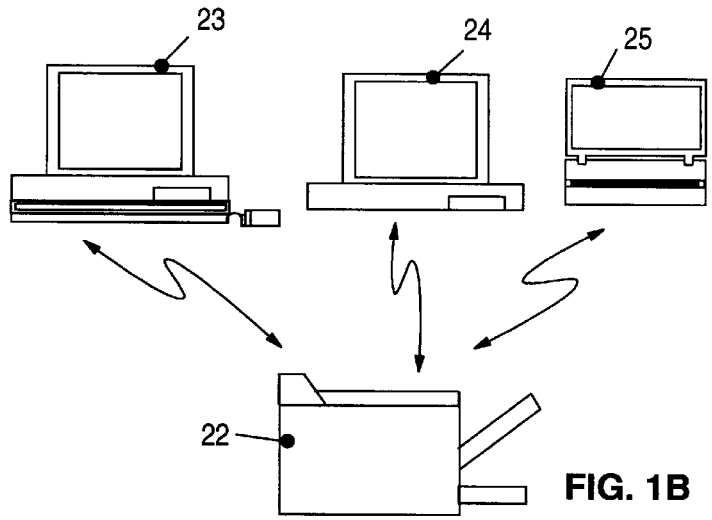
FIG. 1B shows a wireless optical network, sometimes called LAN on a table, interconnecting different computers and terminals as well as peripheral devices (e.g. a printer).

In the following, some typical configurations of wireless communications systems are presented. A simple wireless optical link between a computer and a keyboard is illustrated in FIG. 1A. A wireless optical network, sometimes called LAN on a Table, is shown in FIG. 1B. As illustrated in this Figure, three different units are linked to a fourth one. In the present example, two computers 23, 25 and a terminal 24 are linked to a printer 22.

Figure 1C:
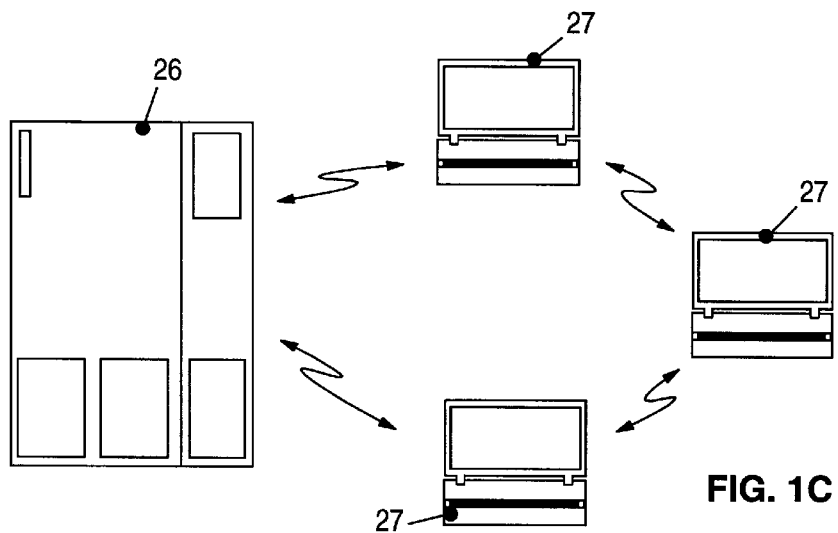
FIG. 1C shows a wireless optical network with ring topology, called Intra Office LAN, interconnecting different computers and a mainframe.

In FIG. 1C, a wireless optical network with ring topology, called Intra Office LAN, is shown. This network interconnects three computers 27 with a mainframe machine 26.

Figure 1D:
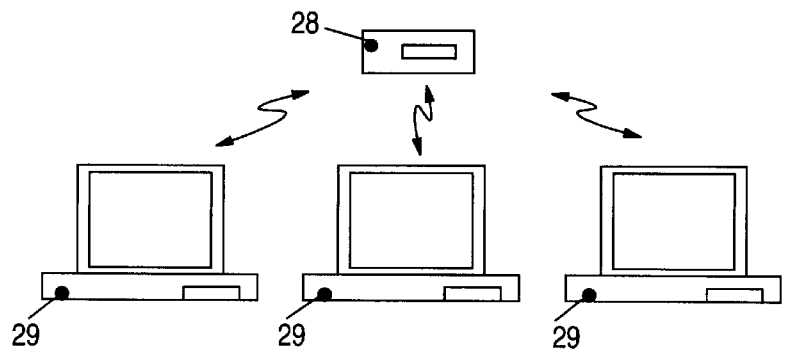
FIG. 1D shows part of a wireless optical network with a repeater situated at the ceiling, called Intra Office LAN with repeater, usually employed in open area offices, conference rooms, or factory halls.

Another exemplary optical network configuration is shown in FIG. 1D. A first unit, e.g. a repeater 28, is situated at the ceiling in order to be able to communicate with remote units. In the present example the remote units are computers 29. Such a configuration is usually called Intra Office LAN with repeater, and might be employed in open area offices, conference rooms, and factory halls.

It has been determined by experiment that the bit error probability of optical communications systems strongly depends on the noise generated by different ambient light environments. Conventional wireless optical systems have proved difficult to operate reliaby under realistic office conditions.

In the following sections, the properties of the present hybrid PPM-FSK (pulse-position-modulation frequency-shift-keying) scheme, a novel modulation format, will be addressed.

Frame Signal Set

Figure 2:
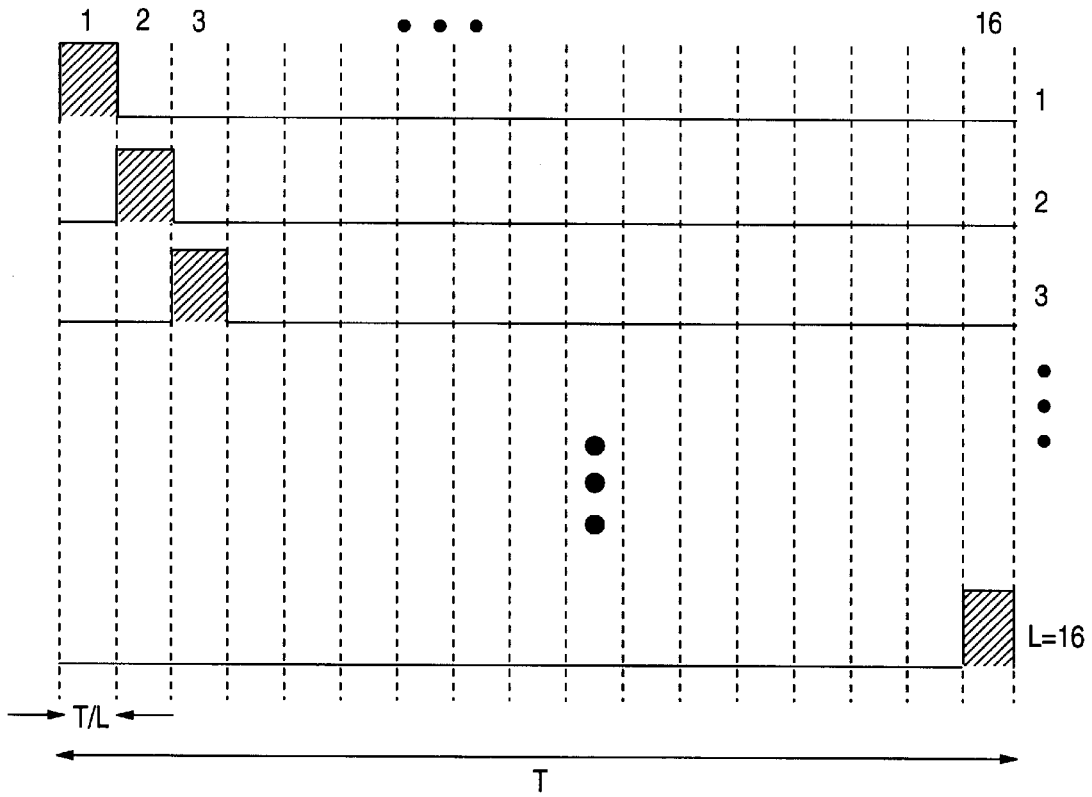
FIG. 2 illustrates a frame signal set for a L-slot hybrid PPM-FSK system (L=16), in accordance with the present invention.

FIG. 2 shows the frame signal set for an L-slot hybrid PPM-FSK system with, for example, 16 slots (L=16). As in a conventional L-PPM baseband system, there are L possible pulse positions, such that the pulse in each frame (sometimes also referred to as symbol) carries $\log_2(L)$ bits of information. In contrast to ordinary L-PPM systems where the pulses transmitted are rectangular baseband pulses, the present hybrid PPM-FSK systems use a pulse, possibly non-rectangular for spectral shaping, which is also frequency modulated (indicated by the shaded pulses in FIG. 2—see also FIGS. 3A and 3B). Both baseband L-PPM and hybrid PPM-FSK use intensities such that $\overline{P}$, the allowed average intensity of the light source of the transmitter, is usually not exceeded. Under certain conditions exceptions may be tolerable.

Rectangular Shaped Pulse

Figure 3A:
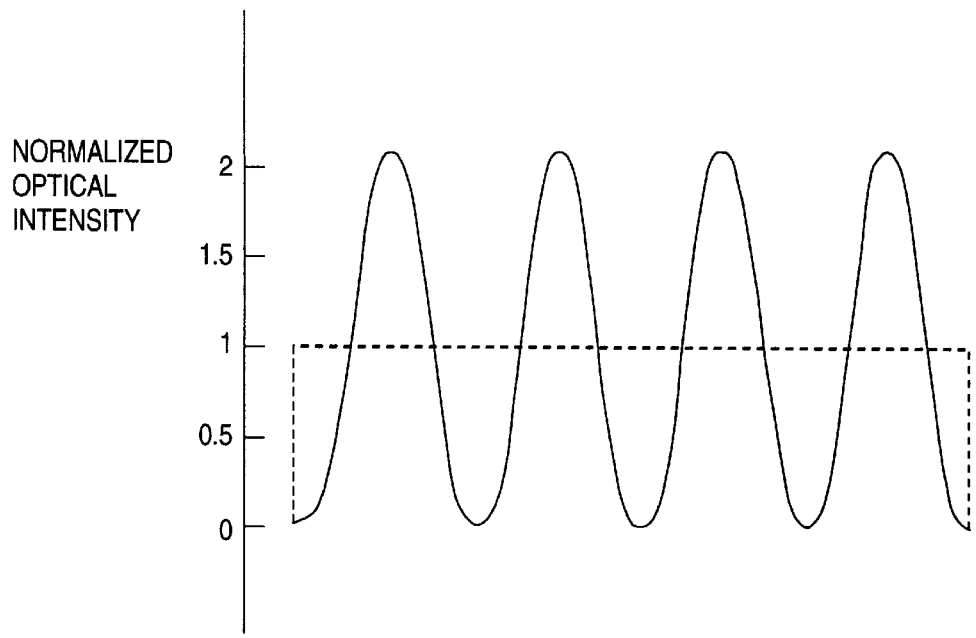
FIG. 3A illustrates an example of a rectangular shaped pulse according to equation (1a) for a L-slot hybrid PPM-FSK system (n=4).
Figure 3B:
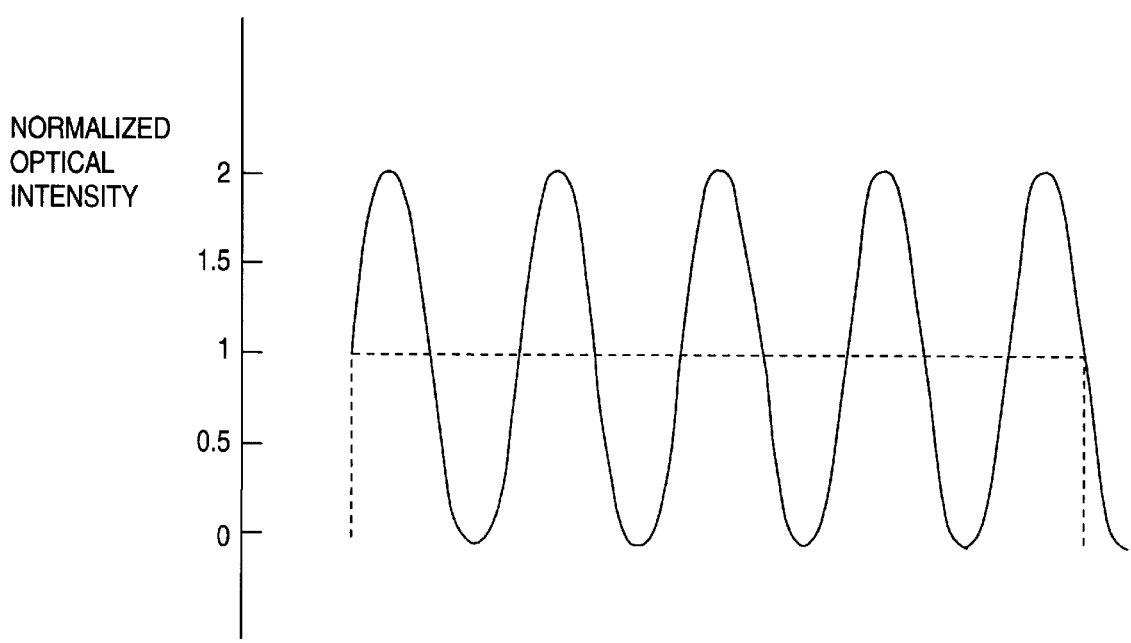
FIG. 3B illustrates an example of a rectangular shaped pulse according to equation (1b) for a L-slot hybrid PPM-FSK system (n=4).

FIGS. 3A and 3B show exemplary rectangular shaped pulses to be used in the present hybrid PPM-FSK system. Their forms reflect the fact that the optical intensity of the optical transmitter, e.g. an IR transmitter, can only have positive values. The proposed hybrid PPM-FSK makes use of the allowed average intensity, $\overline{P}$, which can be delivered by the transmitter. I.e. the average intensity of the frequency modulated pulse in FIG. 3A equals $\overline{P}$, the average intensity of the corresponding rectangular baseband pulse (dashed lines in FIGS. 3A and 3B). We ignore here the fact that the peak intensity of the transmitter may also be limited in practice; also, under certain conditions, for example as in FIG. 3B, $\overline{P}$ may be insignificantly exceeded. Mathematically, the rectangular shaped pulse for L-slot hybrid PPM-FSK can take the form $$p(t) = \begin{cases} 1 - \cos\left(2\pi \frac{nL}{T} t\right), & 0 \leq t < T/L \\ 0, & \text{otherwise,} \end{cases} \tag{1a}$$

or

-continued $$p(t) = \begin{cases} 1 + \sin\left(2\pi \frac{(n+0.5)L}{T}t\right), & 0 \le t < T/L \\ 0, & \text{otherwise,} \end{cases} \quad (1b)$$

where T is the frame duration, L is the number of slots per frame and $n \ge 1$ is an integer (in FIGS. 3A and 3B n=4 is used). The resulting subcarrier frequencies are thus nL/T and (n+0.5)L/T, respectively. The frame signal set, shown in FIG. 2, can now be defined on the interval $t \in [0,T)$ as $$s_i(t) = \begin{cases} p[t-(i-1)T/L], & (i-1)(T/L) \le t < i(T/L) \\ 0, & \text{otherwise,} \end{cases} \quad (2)$$

with i=1, 2, 3, ..., L. Independent frame signal sets of the form (2) can be obtained by properly choosing different values for n in equations (1a) or (1b) for each set, yielding different subcarrier frequencies. Note that equations (1) imply 100% modulation of the rectangular pulse with the subcarrier. In practice, less than 100% modulation may be used.

Arbitrary Shaped Pulse

Pulse shaping can be introduced to control the frequency spectrum of the pulse. Let g(t) be a positive function defined on the interval [0, T/L) such that $$\frac{1}{T}\int_0^{T/L} g(t)dt = \overline{P}, \quad g(t) \ge 0. \quad (3)$$

Equation (3) assures that hybrid PPM-FSK signals essentially satisfy the transmitter's average intensity constraint. The arbitrary shaped pulse used in the present hybrid PPM-FSK systems is then given by $$p(t) = \begin{cases} g(t)\left[1 - \cos\left(2\pi \frac{nL}{T}t\right)\right], & 0 \le t < T/L \\ 0, & \text{otherwise,} \end{cases} \quad (4a)$$

or $$p(t) = \begin{cases} g(t)\left[1 + \sin\left(2\pi \frac{(n+0.5)L}{T}t\right)\right], & 0 \le t < T/L \\ 0, & \text{otherwise,} \end{cases} \quad (4b)$$

Figure 4:
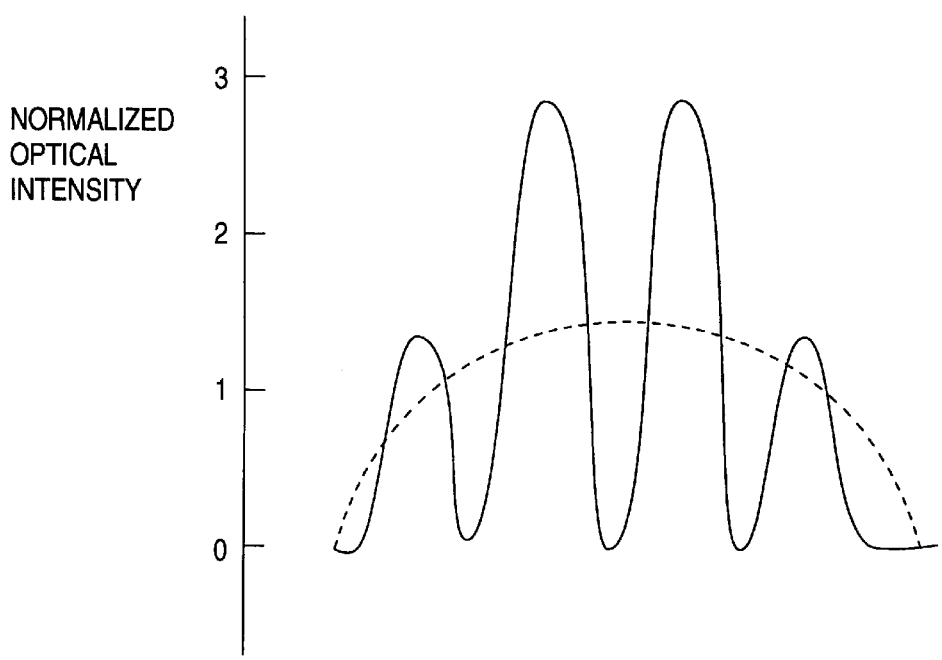
FIG. 4 illustrates an example of a sinusoidal shaped pulse for a L-slot hybrid PPM-FSK system.

For the rectangular pulse illustrated in FIGS. 3A and 3B the shaping function $g(t) = L\overline{P}$, $0 \le t < T/L$. For the example shown in FIG. 4, equation (4a) has been used with $g(t) = (\pi/2) \sin[\pi(L/T)t]$, $0 \le t < T/L$.

Bandpass Signal

Figure 6:
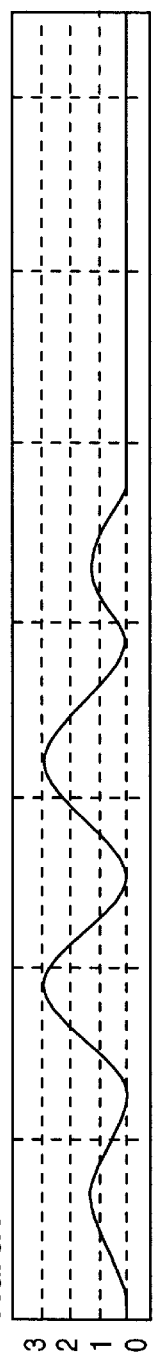
FIG. 6 illustrates an estimated example of a sinusoidal shaped pulse for a L-slot hybrid PPM-FSK system (see also FIG. 4):
 a) pulse time response,
 b) pulse frequency response,
 c) frequency response of filtered (bandpass) pulse, and
 d) time response of filtered (bandpass) pulse.
Figure 6:
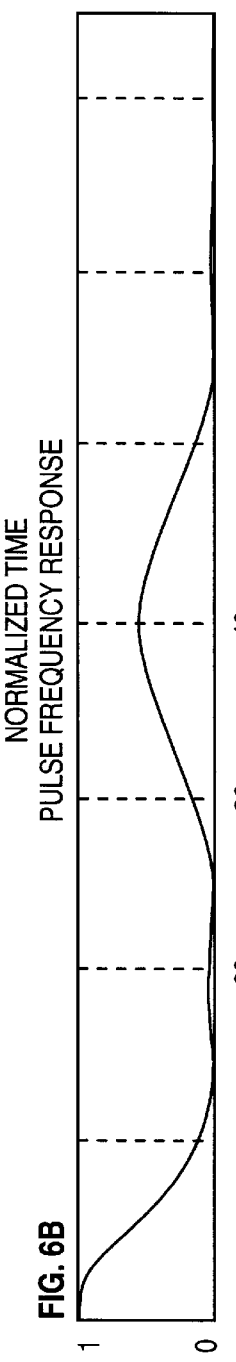
Figure 6:
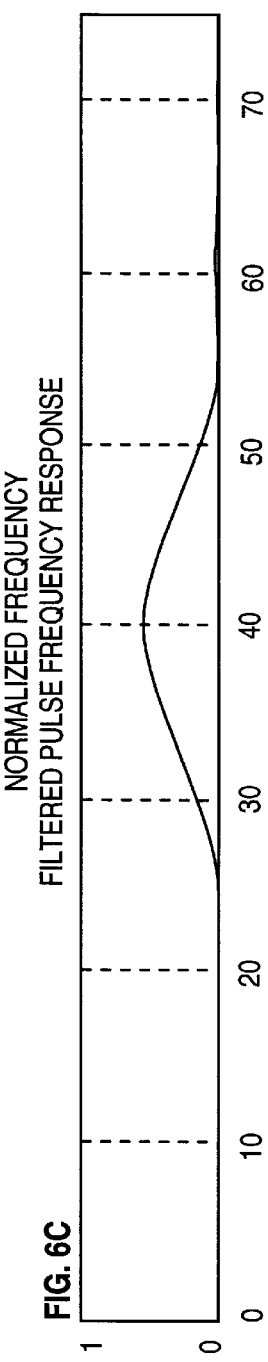
Figure 6:
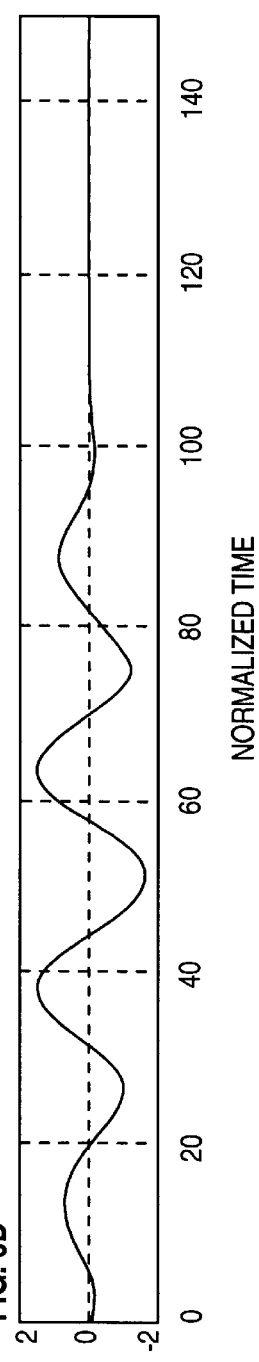

FIGS. 5 and 6 show examples for the rectangular pulse and the sinusoidal shaped pulse, respectively, using equation (4a) with n=4. The time responses (at the bottom of these Figures) for the filtered pulses (bandpass signals) indicate that the shaping function g(t) can be recovered from the envelope of the frame pass signal.

Expanded Frame Signal Set

The frame signal set for hybrid PPM-FSK defined in (2) for a specific subcarrier frequency transmits $\log_2(L)$ bits per frame, as is the case for baseband L-PPM. One way of increasing the dimensionality of the frame signal set, but without changing L, is to assign different subcarrier frequencies to the same frame signal set, rather than assigning different subcarriers to independent signal sets. For example, with two subcarrier frequencies assigned to the same set, $\log_2(2L)$ bits per frame can be transmitted. In general, with M subcarrier frequencies assigned to the same set, $\log_2(ML)$ bits per frame can be transmitted. We can thus define a new expanded frame signal set, defined on the interval $t \in [0,T)$, as $$s_i^{[m]}(t) = \begin{cases} p_m[t-(i-1)T/L], & (i-1)(T/L) \le t < i(T/L) \\ 0, & \text{otherwise,} \end{cases} \quad (5)$$

with i=1, 2, ..., L; m=1, 2, ..., M, where the pulse for the m-th subcarrier is defined as $$p_m(t) = \begin{cases} g(t)\left[1 - \cos\left(2\pi \frac{n_m L}{T}t\right)\right], & 0 \le t < T/L \\ 0, & \text{otherwise,} \end{cases} \quad (6a)$$

or $$p_m(t) = \begin{cases} g(t)\left[1 + \sin\left(2\pi \frac{(n_m + 0.5)L}{T}t\right)\right], & 0 \le t < T/L \\ 0, & \text{otherwise,} \end{cases} \quad (6b)$$

with integers $n_m = n_1, n_2, \ldots, n_M$. The subcarrier pulse signals are orthogonal to each other (zero cross-correlation) since their separation in frequency is a multiple of L/T. This property allows for both coherent and noncoherent detection of the bandpass components of the PPM-FSK pulses, although the latter method has proved to be more practical. Tables 1, 2, and 3 illustrate the relevant parameters which characterize expanded frame signal sets. The following definitions apply:

| | |
|---|---|
| L | number of slots per frame |
| M | number of subcarriers in frame signal set |
| $\log_2(ML)$ | number of bits transmitted per frame |
| T | frame duration [s] |
| $R_b = \log_2(ML)/T$ | aggregate bit rate [bps] |
| $\tau = T/L = \dfrac{\log_2(ML)}{LR_b}$ | pulse (slot) width [s] |

TABLE 1

Example for $R_b$ = 1 Mbps and M = 1

| L | $\log_2(ML)$ | τ[ns] | T[ns] |
|---|---|---|---|
| 2 | 1 | 500 | 1000 |
| 4 | 2 | 500 | 2000 |
| 8 | 3 | 375 | 3000 |
| 16 | 4 | 250 | 4000 |
| 32 | 5 | 156.25 | 5000 |

TABLE 2

Example for $R_b$ = 1 Mbps and M = 2

| L | $\log_2(ML)$ | τ[ns] | T[ns] |
|---|---|---|---|
| 2 | 2 | 1000 | 2000 |
| 4 | 3 | 750 | 3000 |

TABLE 2-continued

Example for $R_b$ = 1 Mbps and M = 2

| L | log$_2$(ML) | τ[ns] | T[ns] |
|---|---|---|---|
| 8 | 4 | 500 | 4000 |
| 16 | 5 | 312.5 | 5000 |
| 32 | 6 | 187.5 | 6000 |

Alternatively, the pulse (slot) width τ can be kept constant as M is changed, resulting in an increased aggregate data rate. The relative increase can be expressed as $$\frac{R_b(M)}{R_b(M=1)} = 1 + \frac{\log_2(M)}{\log_2(L)}. \quad (7)$$

For M=2, for example, the increase in aggregate data rate is 100/log$_2$(L) in percent (see table 3). Note that we ignore guard bands between frames or packets of frames when computing the aggregate data rate.

TABLE 3

Example of increase in data rate for M = 2

| L | 100/log$_2$(L)[%] |
|---|---|
| 2 | 100 |
| 4 | 50 |
| 8 | 33 |
| 16 | 25 |
| 32 | 20 |

Effect of Multipath Propagation

Figure 7:
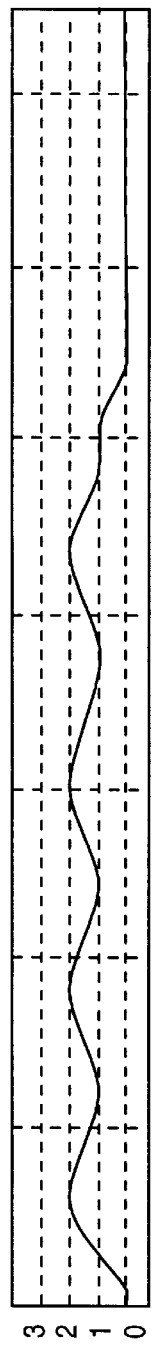
FIG. 7 illustrates an estimated example of the effect on a bandpass signal (bottom) in the presence of multipath distortion.
Figure 7:
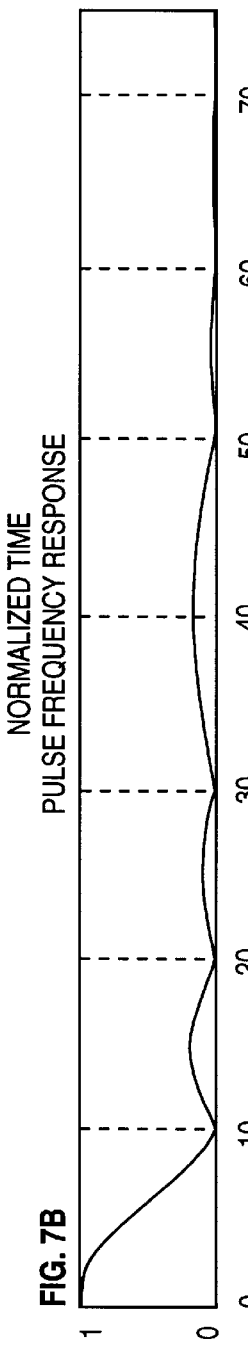
Figure 7:
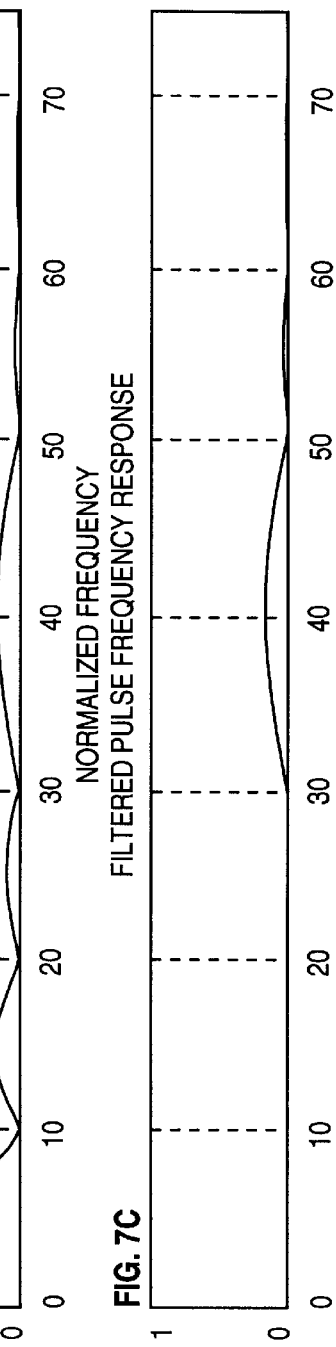
Figure 7:
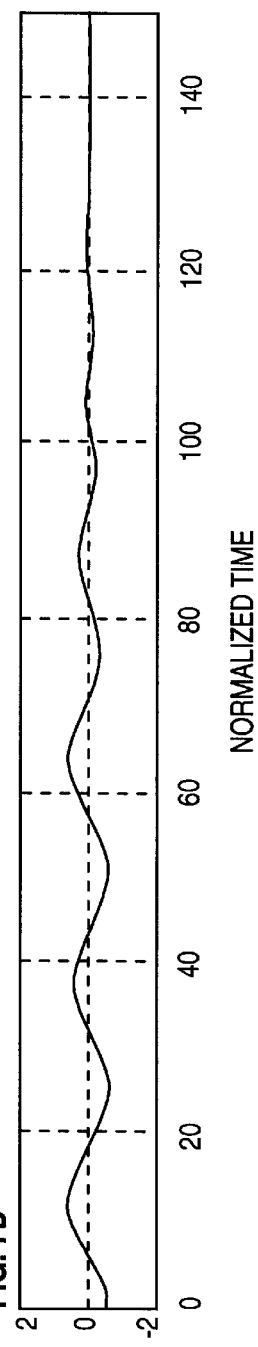
Figure 8:
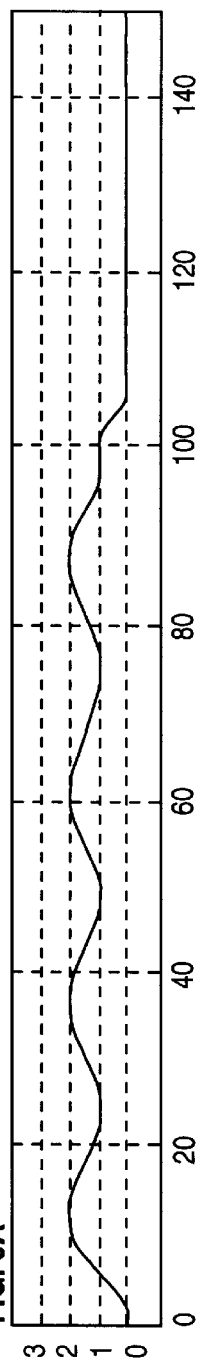
FIG. 8 illustrates an estimated example of the effect on a baseband signal (bottom) in the presence of multipath distortion.
Figure 8:
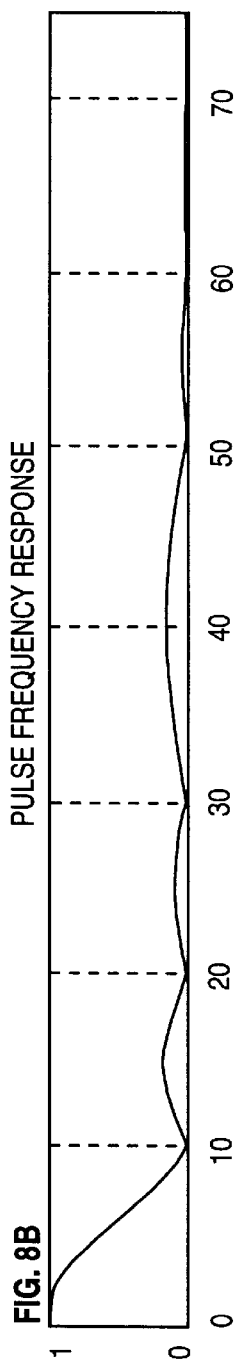
Figure 8:
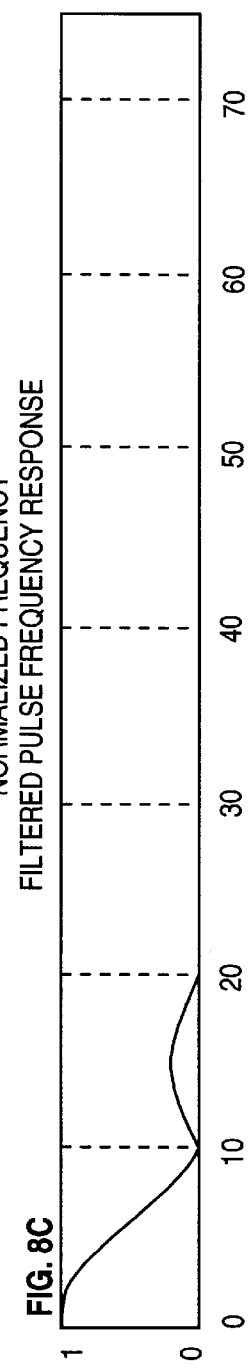
Figure 8:
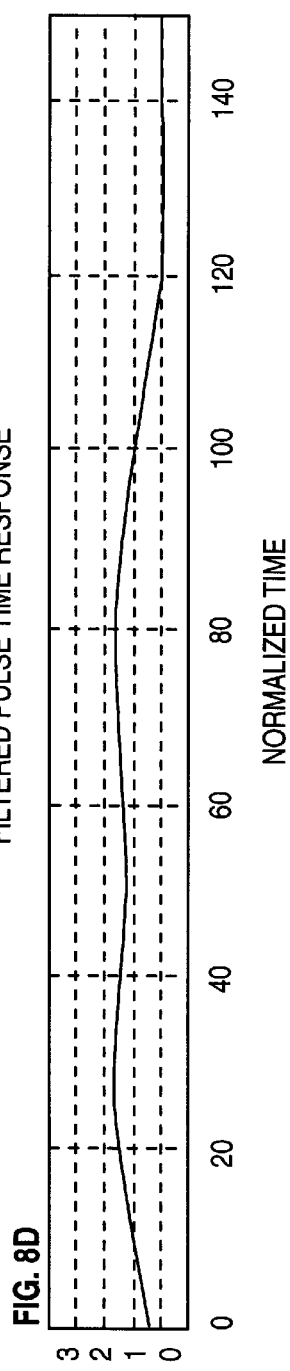

Multipath propagation affects hybrid PPM-FSK signals such that the signal components from the delayed paths constructively or destructively influence the composite signal, depending on the relation between the delays and the subcarrier frequency. Conventional FSK is affected similarly. The simple two-path model $$r(t) = s(t) + \alpha s(t - t_D) \quad (8)$$

is considered, where $t_D$ is the delay time and α is an attenuation factor. With equation (1a) for the pulse waveform, the effect of destructive multipath distortion is illustrated in FIGS. 7 and 8 (where n=4, α=0.5, and $t_D$=τ/8) the bandpass (filtered) waveform is reduced in amplitude by a factor of two while the amplitude of the baseband pulse is increased by about 50%. Constructive multipath distortion of the bandpass waveform can be similarly obtained with an appropriate $t_D$. The case illustrated in FIGS. 7 and 8 is rather extreme to show the effect.

The effect of multipath distortion in a practical situation depends critically on the chosen data rate which in turn determines the slot width T/L used. Based on estimates of the power penalty incurred by multipath distortion for an on-off keyed (OOK) system, it can be expected that similar results hold for the present hybrid PPM-FSK signals.

Compatibility with (existing) Baseband PPM Systems

From equations (4a) and (4b) follows clearly that the frequency spectrum of the intensity pulse p(t) has a baseband component as well as a bandpass component. For equation (4a) we have the Fourier transform pair $$p(t) \leftrightarrow P(f) = G(f) - \frac{1}{2}\left[G\left(f + \frac{nL}{T}\right) + G\left(f - \frac{nL}{T}\right)\right]. \quad (9)$$

With appropriate choice of n, this implies that IR intensity signals transmitted from a hybrid PPM-FSK source can be received from both bandpass receivers as well as baseband receivers. Hence, the present hybrid PPM-FSK systems can be made downward compatible with existing baseband PPM schemes. Downward compatibility can be used with only a single network operating in a given location since the baseband spectra of different uncoordinated subcarrier pulses interfere with each other.

Potential for Diversity Gain

The fact that equation (9) holds for hybrid PPM-FSK pulses may be exploited by combining signals simultaneously recovered from a bandpass receiver (envelope) and a baseband receiver. Such a scheme may improve system performance, in particular in the presence of multipath distortion. Again, this scheme can only be applied when a single network is being used in a given location since the baseband spectra of different, uncoordinated subcarrier pulses interfere with each other.

In the following, some applications of the present hybrid PPM-FSK scheme in optical wireless systems are addressed. Hybrid PPM-FSK signals can be used in different ways in optical wireless systems. The added dimensionality in the frequency domain can be exploited to obtain different modes of operation:

1. Independent Collocated Networks

Different frame signal sets can be assigned to different subcarrier frequencies to obtain independent multichannel operation for collocated networks. The receivers in a given network use the same bandpass filters to suppress interference from the collocated networks operating with different subcarriers. In addition, any interference caused by fluorescent light sources is suppressed in all networks, provided that the smallest n in equations (1a) and (1b) is chosen such that the corresponding bandpass filter passes no frequency components below the frequency limit to which interference from fluorescent lighting can be expected. This frequency limit is typically 500 kHz.

2. Coordinated Collocated Networks

If needed, collocated networks operating with different subcarrier frequencies could coordinate their activities by observing the baseband spectrum since the transmitters of all networks are transmitting the baseband pulse besides the desired bandpass signal. Any active transmitter within the different networks can thus be sensed by all networks, independent of the subcarrier frequency used by a particular network. The "carrier sense" detector (actually sensing the baseband spectrum) can be identical for all receivers used in the different networks.

3. Single Network with Auxiliary Channel

Assume a situation where only a single network operates in the same location. The added frequency dimension offered by the present hybrid PPM-FSK signals could then be used to obtain a higher aggregate data rate as explained above. Alternatively, the frequency dimension could be used as an auxiliary parallel channel to simultaneously transmit independent data, or redundant (e.g. parity) data. The redundant data could for example be used for error correction or erasure. Two scenarios are possible:

The main channel is formed by either the baseband L-PPM scheme or the basic underlying L-PPM scheme (ignoring information on subcarrier frequencies), which transmits at the bit rate $R_{main}$=[log$_2$(L)]/T, and the auxiliary channel is formed by $M \geq 2$ subcarriers, which transmit at the bit rate $R_{aux}=[\log_2(M)]/T$.

The main channel is formed by the baseband L-PPM scheme, which transmits at the bit rate $R_{main}=[\log_2(L)]/T$. Only one subcarrier (M=1) is used, i.e. data on the auxiliary channel are conveyed by on-off keying (OOK) of the subcarrier at the rate 1/T.

If used independently, the main and auxiliary channels can transmit independent data to two different destinations. If the auxiliary channel transmits redundant data some error correction/erasure scheme can be implemented. The auxiliary channel may also be useful during setup of connections. The auxiliary channel might also be used for retransmission of data in order to reduce the error probability under adverse conditions.

4. Multiple Collocated Networks with Auxiliary Channels

Assume a situation where multiple networks operate in the same location, i.e. the baseband spectrum of the channel cannot be used. The added frequency dimension offered by hybrid PPM-FSK signals could then be used to obtain a higher aggregate data rate by using a distinct set of M subcarriers for each network, as explained above. Alternatively, the frequency dimension could be used as an auxiliary parallel channel to simultaneously transmit independent data or redundant (e.g. parity) data for error correction or erasure. In this application, the main channel is formed by the basic underlying L-PPM scheme (ignoring information on subcarrier frequencies), which transmits at the bit rate $R_{main}=[\log_2(L)]/T$, and the auxiliary channel is formed by $M \geq 2$ subcarriers, which transmit at the bit rate $R_{aux}=[\log_2(M)]/T$. If used independently, the two channels in any particular network can transmit independent data to two different destinations. If the auxiliary channel transmits redundant data some error correction/erasure scheme might be implemented. The auxiliary channel may also be useful during setup of connections.

5. Duplex Operation

The first scenario described in 3. and the scenario described in 4. can be modified to allow duplex operation, i.e. simultaneous transmission and reception between two units in a network (e.g. between a basestation and a mobile unit). This can be accomplished by assigning independent sets of subcarriers for transmission and reception to the terminals involved and by appropriate design of the transmitters and receivers. Duplex operation may also be useful during setup of connections, e.g. for speed negotiations.

A conventional PPM communications system for wireless optical data transmission comprises a transmitter with a PPM encoder for transformation of serial user data into pulse position modulated signals (usually of rectangular shape) and a light source. The receiver of such a PPM system usually comprises means for pulse restoration and a pulse position decoder re-generating said serial user data. The transmitter of the present hybrid PPM-FSK system further comprises means for frequency modulation which modulate a subcarrier frequency $f_1$ with the pulse-position-modulated signals provided by the PPM transmitter part, and means for modulating the intensity of said light source in order to transmit additional or redundant information as bandpass components. The receiver of a hybrid PPM-FSK system might further comprise means for bandpass filtering and means for the detection of said information transmitted as bandpass components.

An extension of the pulse-position-modulated signals to a signal set with a second subcarrier frequency provides for an additional channel for the transmission of information as second bandpass components. The added dimensionality allows duplex communication.

Figure 9:
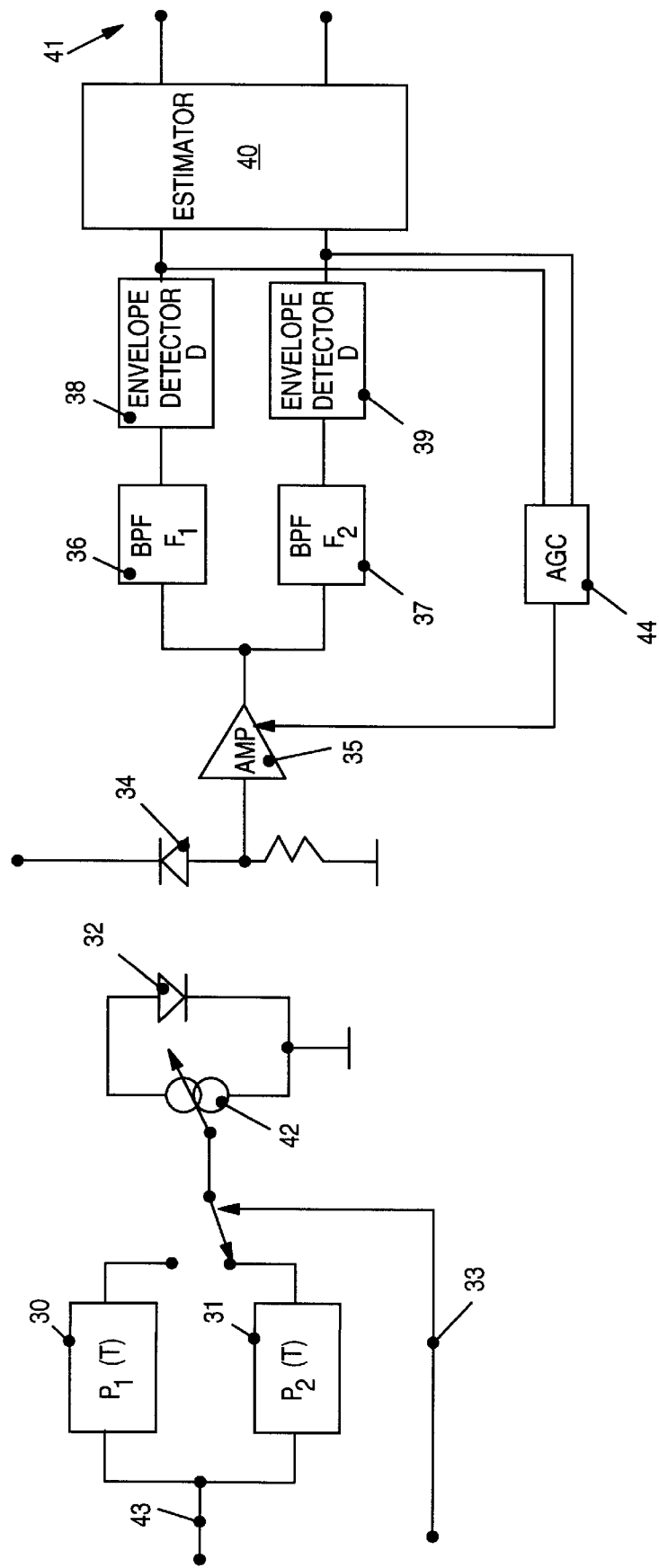
FIG. 9 shows a first basic implementation of the present hybrid PPM-FSK system with two subcarrier frequencies.

Exemplary implementations of the present invention are described in the following. On the left-hand side of FIG. 9, an IR transmitter is shown which operates, according to the hybrid PPM-FSK modulation format proposed, with two subcarrier frequencies $f_1$ and $f_2$. The PPM encoded data on the main data channel 43 are fed to two pulse shaping circuits 30 and 31 for additional frequency modulation with frequencies $f_1$ and $f_2$, respectively, according to Equations (1a) or (1b). The binary auxiliary data channel 33 is used to select one of the FSK modulator outputs, for example, an auxiliary data "0" selects the output of the upper modulator 30 and an auxiliary data "1" selects the lower output of the modulator 31. The resulting hybrid PPM-FSK signal is then used to control a current source 42 which in turn modulates the intensity of the IR light source 32 (LED or laser diode).

A receiver frontend for hybrid PPM-FSK IR intensity signals can be implemented using basic components developed separately in the past for PPM or FSK modulated signals. A photodiode 34 translates the received IR light into an electrical current which results in a corresponding voltage at the output of the amplifier 35. The gain of this amplifier might be controlled by a corresponding gain control circuitry (AGC) 44 which operates such that it ensures constant output voltage over a suitable range of received levels of IR light. In this example, the gain control circuitry 44 derives its output signal controlling amplifier 35 from measuring the signal amplitudes at the outputs of the envelope detectors 38 and 39. Other schemes are possible as well. Other arrangements of photodiode 34 and amplifier 35 are also conceivable. The electrical signal obtained at the output of the amplifier 35 is fed to bandpass filters 36 and 37, and respective envelope detectors 38 and 39.

The outputs of the envelope detectors 38 and 39 are fed to a device 40 which is specifically designed for pulse restoration and frequency decision based on hybrid PPM-FSK signals. In a first operation, device 40 uses the output signals of the two envelope detectors 38 and 39 to derive from them the estimated PPM encoded data signal. It then uses this signal to produce estimated restored pulses and output them on one of the output terminals 41. In a second operation, device 40 uses the output signals of the two envelope detectors 38, 39 to derive from them the estimated frequency information which carries the auxiliary data information. It then uses this signal to produce estimated restored auxiliary data bits and outputs them on one of the output terminals 41.

The estimated pulse positions (according to the PPM part of the invention) and estimated frequency information (according to the FSK part of the invention) are made available at the output of said device 40. The outputs of device 40 may be used for direct decoding of the transmitted main data (pulse position) and auxiliary data (frequency information).

Figure 10:
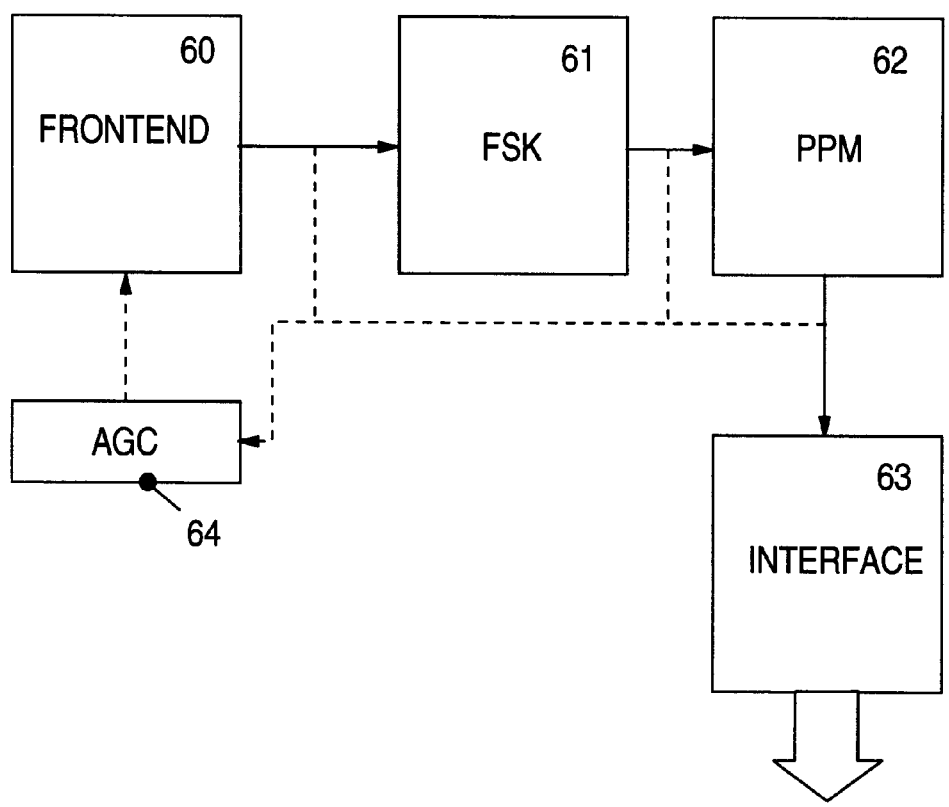
FIG. 10 shows an opto-electronic receiver in accordance with the present invention in order to illustrate the modularity and compatibility of the present hybrid PPM-FSK scheme with conventional PPM systems.

In FIG. 10, an opto-electronic receiver is shown, which is used to illustrate the modularity and compatibility of the present invention with conventional PPM systems. As schematically shown in this Figure, the receiver comprises a conventional opto-electronic receiver 60 (frontend) followed by an optional FSK unit 61, and a PPM unit 62. The output of such a receiver might be coupled via an interface logic 63 to a personal computer or a network for example. Additionally, different implementations of a device for automatic gain control 64 (AGC) are indicated. Different configurations of the above units are conceivable and a receiver might be easily adapted to the respective transmission scheme. Even a conventional PPM receiver, i.e. a receiver only comprising units 60 and 62, is able to receive and detect the baseband components sent by a hybrid PPM-FSK transmitter.

The above described systems (see FIGS. 9 and 10) might comprise means for adjusting the data throughput for the transmission of data from the transmitter to the receiver. The data throughput can either be adjusted automatically or selected and adjusted by the user. For means operating automatically, it is necessary to watch and determine the ambient light conditions. This can be done by direct or indirect means. For example a second photodiode can be employed at the receiver which serves as reference source for determining the actual environment conditions at the receiver. Ambient light conditions can also be estimated from error rate measurements in the receiver itself.

The means for controlling the data throughput and adjusting the data rate can be implemented such that, when adverse ambient light conditions are detected, the transmission rate is reduced on individual channels and the information is transmitted via parallel channels provided by tile PPM-FSK scheme. This allows to keep the data throughput almost constant even under adverse conditions. In case of transmission with reduced data rate, the effective width of the bandpass filter at the receiver side has to be reduced automatically.

By means of a suitable communications protocol, the data throughput for communication between the transmitter and the receiver might be negotiated either when installing a communications system in accordance with the present invention, or each time an optical communication link is setup, or each time a data packet is sent.

When employing the present invention in an optical network with repeater, which retransmits correctly received data packets, as illustrated in FIG. 1D, the overall network throughput and area coverage can be increased. Alternatively, one or several participating units (stations) may be configured to retransmit packets not addressed to themselves. The repeater concept is also suited to increase the overall network range which is important in open area offices, for example, One or several participating units (stations) may be configured to automatically switch to data transmission according to the hybrid PPM-FSK scheme under adverse conditions.

It is to be noted that other types of frequency modulation are possible. Instead of using a constant frequency $f_1$, one could for example linearely increase the frequency over the pulse width (known as chirp-modulation).

I claim:

1. A method for wireless transmission of data in the form of optical signals from a light source of a transmitter, said method comprising the steps of:

transforming a first data signal into a pulse-position-modulated (PPM) signal, modulating a first subcarrier signal of constant or variable frequency $f_1$ with said PPM signal to generate a first frequency modulated signal;

modulating a second subcarrier signal of constant or variable frequency $f_2$ with said PPM signal to generate a second frequency modulated signal;

generating a driver signal consisting of either said first frequency modulated signal or said second frequency modulated signal as selected by a second data signal; and modulating a light source with said driver signal, to transmit data with a baseband component carrying information only of said first data signal and as bandpass components carrying information of both said first data signal and said second data signal.

2. The method of claim 1, wherein a receiver extracts transmitted information from said bandpass components, or extracts transmitted information from said baseband component, or extracts transmitted information from said baseband component and said bandpass components.

3. The method of claim 2 wherein said bandpass components are used for duplex transmission of data.

4. The method of claim 2, wherein said receiver extracts data from said baseband component and said bandpass components, said components being used to reduce the error probability of the transmitted data.

5. The method of claim 1, wherein said baseband component is used for protocol negotiations at connection setup.

6. A transmitter for use in an optical wireless pulse-position-modulation (PPM) communication system, comprising a PPM encoder for transforming a first data signal to be transmitted into a PPM signal;

a first frequency modulator for modulating a first subcarrier signal of constant or variable frequency $f_1$ with said PPM signal to generate a first frequency modulated signal;

a second frequency modulator for modulating a second subcarrier signal of constant or variable frequency $f_2$ with said PPM signal to generate a second frequency modulated signal;

a light source, a means for generating a driver signal consisting of either said first frequency modulated signal or said second frequency modulated signal as selected by a second data signal; and, a means for modulating said light source with said driver signal to transmit data as a baseband component carrying information only of said first data signal and as bandpass components carrying information of both said first data signal and said second data signal.

7. An optical wireless pulse-position-modulation (PPM) communication system comprising:

a transmitter further comprising
      a PPM encoder for transforming a first data signal to be transmitted into a PPM signal;
      a first frequency modulator for modulating a first subcarrier signal of constant or variable frequency $f_1$ with said PPM signal to generate a first frequency modulated signal;
      a second frequency modulator for modulating a second subcarrier signal of constant or variable frequency $f_2$ with said PPM signal to generate a second frequency modulated signal;
      a means for generating a driver signal consisting of either said first frequency modulated signal or said second frequency modulated signal as selected by a second data signal;
      a light source; and,
      a means for modulating said light source with said driver signal to transmit data as a baseband component carrying information only of said first data signal and as bandpass components carrying information of both said first data signal and said second data signal;

and a receiver further comprising
      an opto-electronic converter for conversion of optical signals received into electrical signals, and a means for extracting data from said baseband component and pulse position decoding means for detection of said data extracted from said baseband component, or a means for extracting data from said bandpass components and means for detection of said data from said bandpass components, or a means for extracting data from said baseband component and bandpass components and means for detection of said data extracted from said baseband component and bandpass components.

8. The receiver of claim 7 further comprising:

a means for extracting data transmitted as further bandpass components within said optical signal, a means for detection of said data extracted from said further bandpass components.

9. The PPM communication system of claim 7, equipped for duplex communication by transmission of data as first, second or higher bandpass components.

10. The PPM communication system of claim 7, comprising means for increasing the dimensionality of a frame signal set used for the pulse-position-modulation by assigning different subcarrier frequencies to said frame signal set, said subcarrier frequencies being orthogonal to each other.

11. The PPM communication system of claim 10, wherein different frame signal sets are assigned to different subcarrier frequencies to obtain independent multichannel operation for collocated networks.

12. The PPM communication system of claim 11, wherein all receivers of a first network use the same bandpass filters to suppress interference from said collocated networks operating with different subcarrier frequencies.

13. The PPM communication system of claim 11, wherein different frame signal sets are assigned to different subcarrier frequencies to obtain multichannel operation for collocated networks, the activities of said collocated networks being coordinated by means of carrier sense detectors sensing said baseband components originating from any transmitter of said collocated networks.

14. The PPM communication system of claim 7, wherein said receiver comprises means for coherent and/or noncoherent, including hybrid, detection of said bandpass components.

15. The PPM communication system of claim 7, wherein signals extracted from said bandpass and baseband components are used to reduce the error probability of the transmission caused by multipath distortion and/or noise and/or ambient light.

16. The PPM communication system of any of the preceding claims, wherein said bandpass components are used during setup of a connection between said transmitter and said receiver.

* * * * *